April 7, 1936.   R. H. WALTER   2,036,901
FABRIC MEASURING MACHINE
Filed May 10, 1932   5 Sheets-Sheet 1
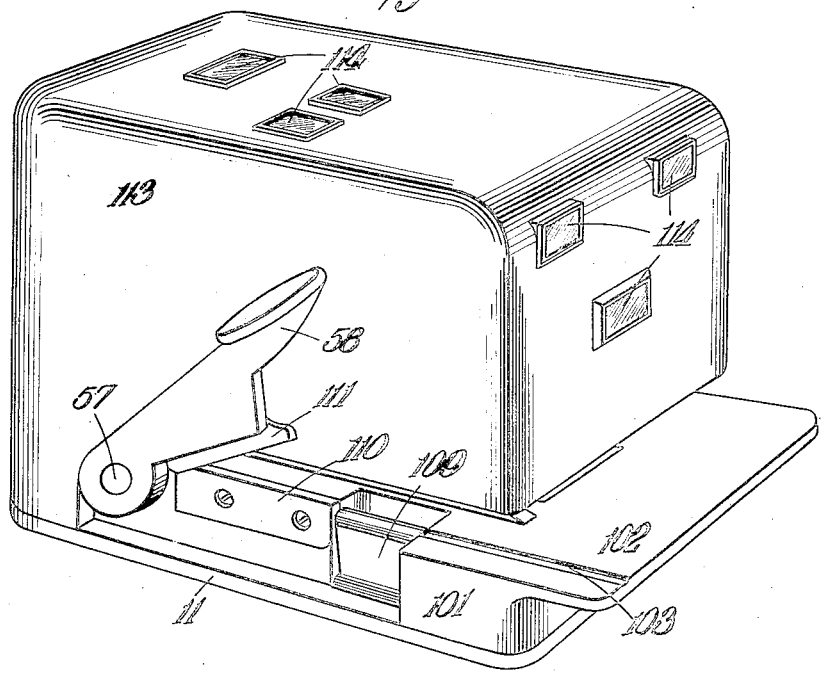
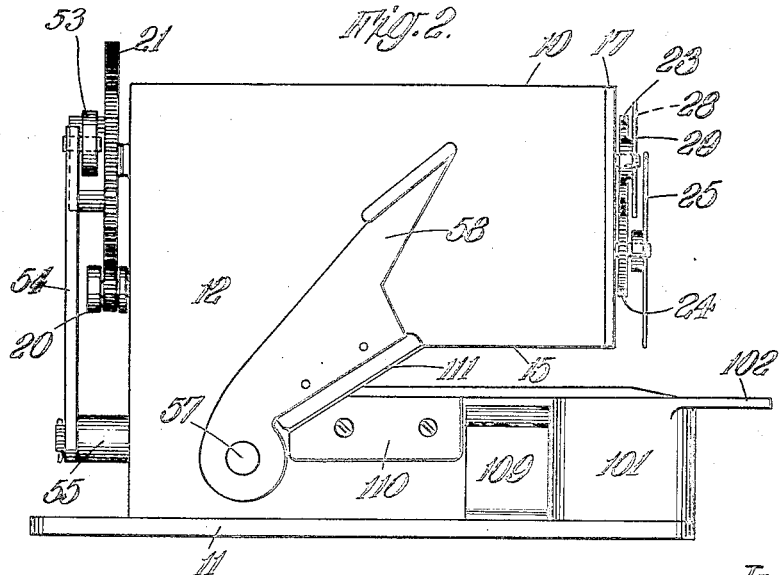
Inventor
R. H. Walter
by Wilkinson & Mawhinney
Attorneys.

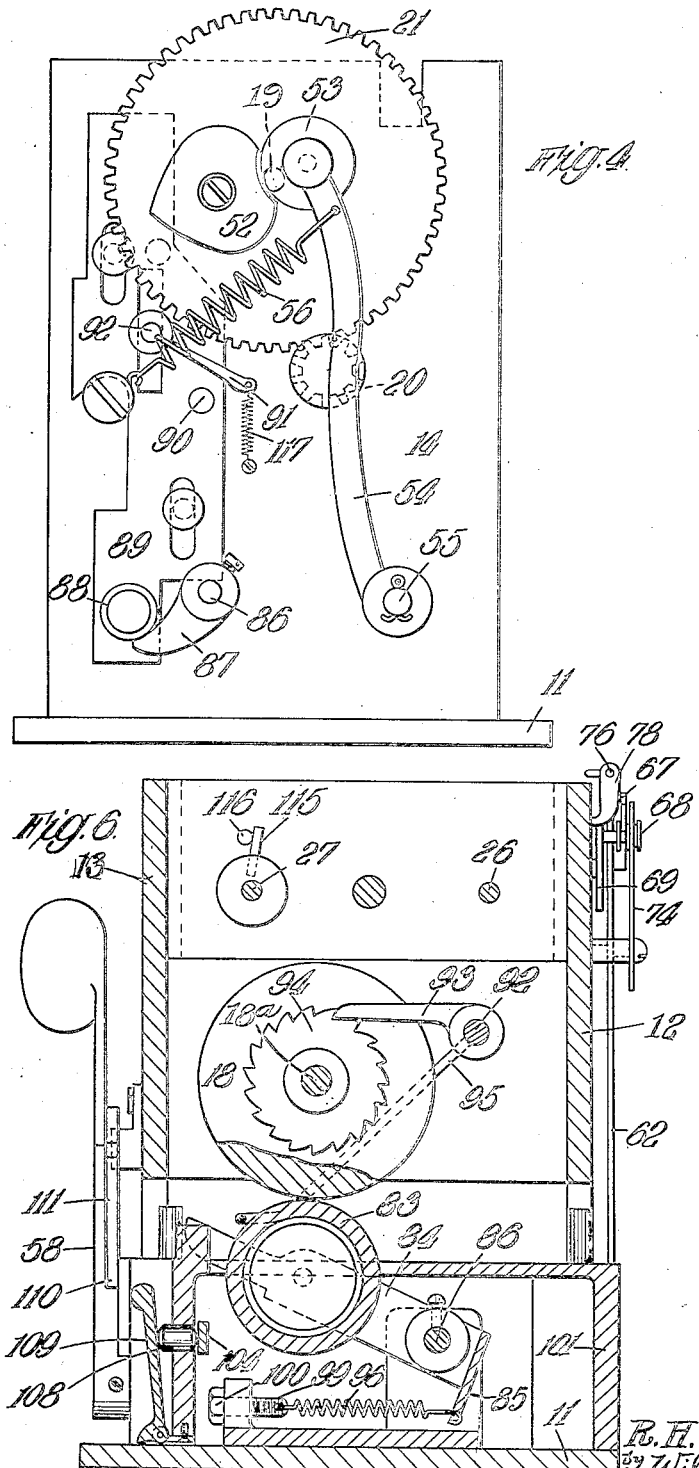

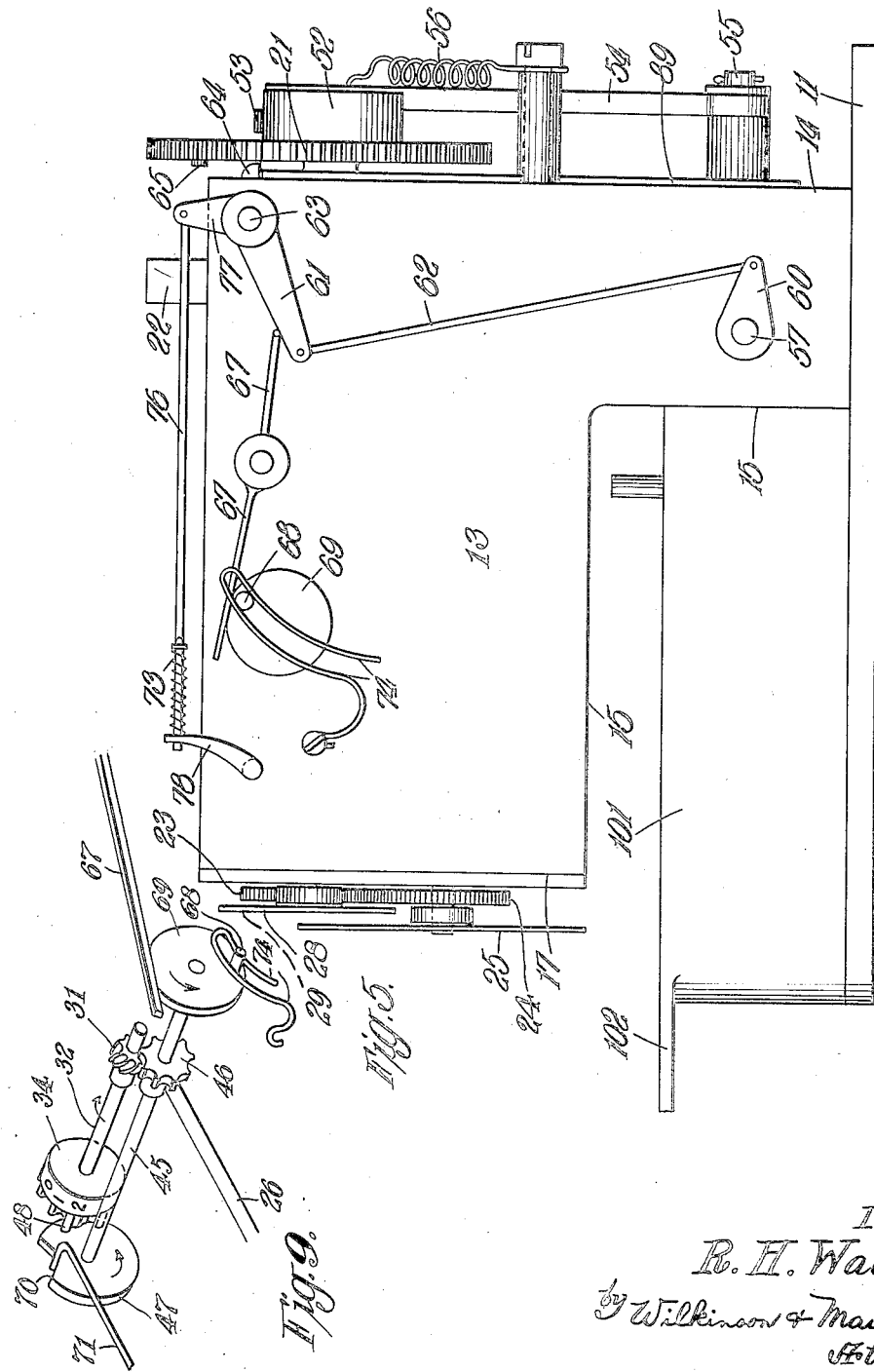

April 7, 1936. R. H. WALTER 2,036,901
FABRIC MEASURING MACHINE
Filed May 10, 1932  5 Sheets-Sheet 5

Inventor
R. H. Walter
by Wilkinson & Mawhinney
Attorneys.

Patented Apr. 7, 1936

2,036,901

UNITED STATES PATENT OFFICE 2,036,901

FABRIC MEASURING MACHINE

Roger Herbert Walter, London, England, assignor, by direct and mesne assignments, to The Fabricmeter Co. Limited, London, England, an English joint-stock company Application May 10, 1932, Serial No. 610,407
In Great Britain June 5, 1931

7 Claims. (Cl. 235—144)

The present invention relates to measuring or counting machines of the kind comprising indicating devices acting on a cyclical principle, that is, rotary discs or pointers, endless bands or the like and refers more particularly to machines for measuring textile and the like fabrics.

The principal object of the invention is the provision of improved means for re-setting the indicating devices to the zero position in machines of the kind herein first referred to.

According to the present invention in a machine for measuring textile fabrics and the like wherein a cyclically operating indicating device is embodied, and wherein the fabric to be measured is drawn between a system of rollers embodying a movable pressure roller and a fixedly mounted measuring roller, there is provided a manually actuated lever or the like which on completion of each measuring operation is adapted and arranged to simultaneously (a) re-set said indicating device to the zero-reading position, (b) slit the fabric and (c) withdraw the pressure roller from the measuring roller whereby to release the fabric.

According to a feature of the invention, in a measuring or counting machine provided with an indicating device operating on a cycle and means for re-setting said indicating device to the zero-reading position, the said zero-setting means are so constructed, arranged and operative that the indicating device is returned to zero position by the smallest possible displacement, that is by half a complete cycle or less, the return to zero being performed in whichever direction corresponds with said smallest displacement.

The zero-setting means are preferably spring actuated and in a preferred form include a substantially heart-shaped cam mounted on a shaft operatively connected with the indicating device and a spring-loaded element adapted to apply pressure on said cam.

When the indicating device is arrested at exactly half-cycle, a "dead-centre" occurs and the zero-setting means preferably includes means for throwing the indicating device off such dead-centre, which latter means may embody either an automatically operating spring bias device or a manually actuated trip device.

A further object of the invention is to enable a machine capable of measuring or counting very large quantities to be re-set to zero position with great rapidity.

According to another feature of the invention a measuring or counting machine comprises an indicating device provided with zero-setting means, a second indicating device and zero-setting means therefor, a driving connection between said indicating devices including a reduction gear and means for releasing both said devices for return to zero position, said last means including means for disconnecting the driving connection during the operation of re-setting to zero position.

According to a further feature of the invention at least two cyclically operating indicating devices may be provided, together with drive means whereby one such device on completing a cycle advances the other such device through part of a cycle, means for re-setting the first indicating device to zero position, means for re-setting the second indicating device to zero position and means for releasing both indicating devices for return to zero position, so constructed, arranged and operating that the return of one of the indicating devices to zero position is completed before the other such device is released for return to zero position.

Further objects of this invention comprise the provision of an improved fabric measuring machine having characteristics superior to those of hitherto known machines in respect to robustness, simplicity, cheapness both in manufacture and maintenance, rapidity of operation and freedom from liability to derangement. These objects also include the provision of means whereby great lengths of fabric (e. g. up to one hundred yards or more) may be measured without re-setting the indicating means to zero.

In fabric measuring machines of the hitherto known types the length of fabric measurable at one pass has been limited by the fact that the return to zero has been accomplished by retracing the whole of the measuring movement and such machines have usually been limited to a maximum measurement of twelve yards, measurements of greater lengths being carried out by re-setting the machine every twelve yards.

In a machine constructed according to the present invention the return to zero of all dials (or the like indicating elements) is practically instantaneous so that the machine may be constructed to measure much greater lengths of fabric at one pass. In a preferred form of construction the machine has three sets of indicating elements (dials or drums) one indicating fractions of a yard or other unit, another units up to ten and a third tens of units up to a hundred. In this form of construction the zero-return both of the fractions and of the units indicators may conveniently be by the minimum displacement, as described above, the return of the tens indicators being by simple reverse motion.

The nature of the present invention and in what manner the same is to be performed will be more fully understood from the following description of a constructional embodiment thereof with reference to the accompanying drawings, of which:—

Fig. 1 is a view in perspective of the complete machine.

Fig. 2 is a side elevation taken from the side on which the operating handle is placed.

Fig. 4 is an end elevation taken from the rear, or salesman's end.

Fig. 5 is a side elevation taken from the side opposite the operating handle.

Fig. 6 is a vertical section taken along the line 6—6 in Fig. 3.

In Figs. 2 to 6 the outer cover of the machine has been removed.

Figure 3:
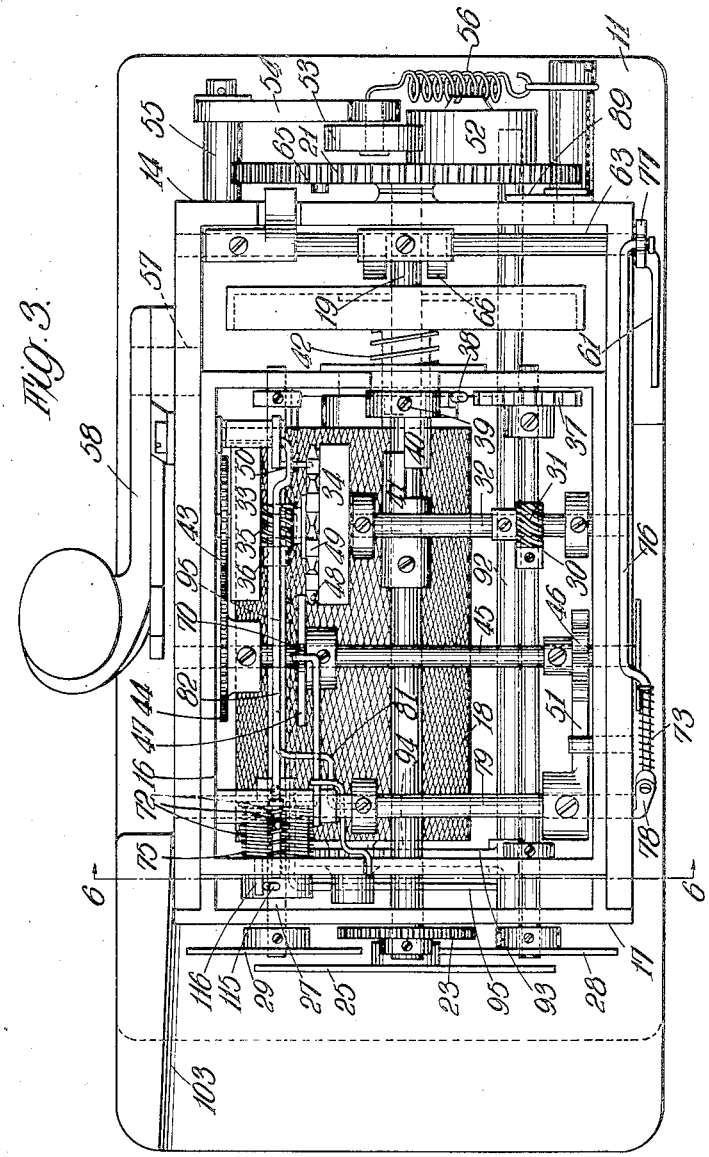
Fig. 3 is a top plan view.
Figure 7:
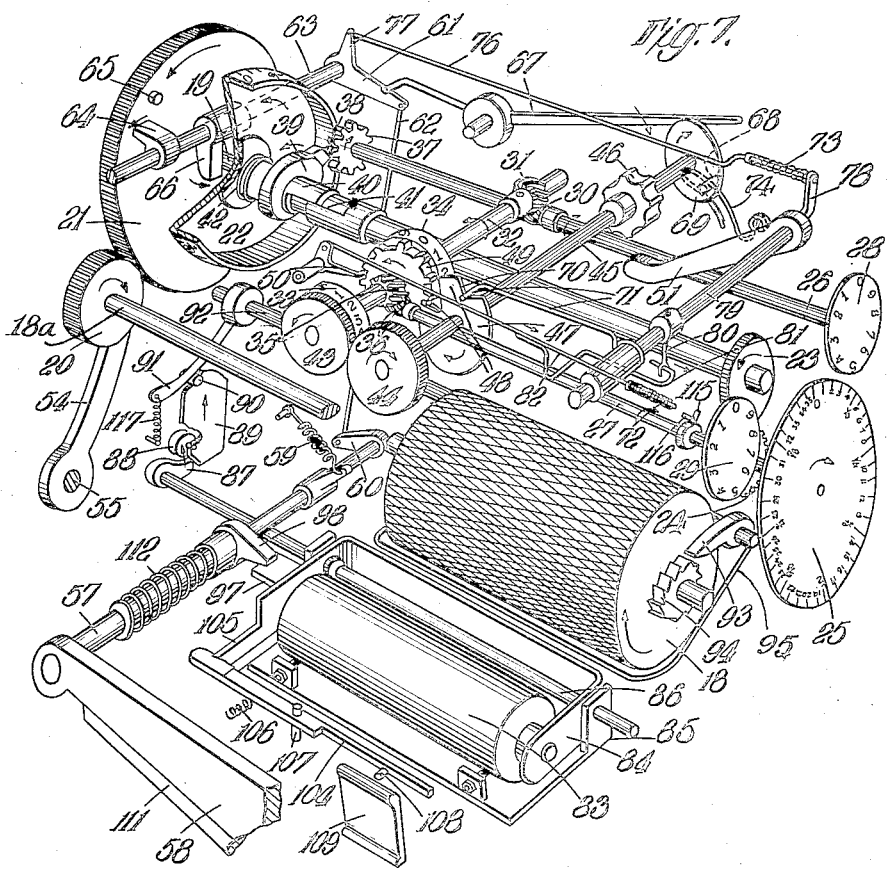

Fig. 7 is a somewhat diagrammatic and partially exploded view of the internal mechanism of the machine, shown in perspective.

Figure 8:
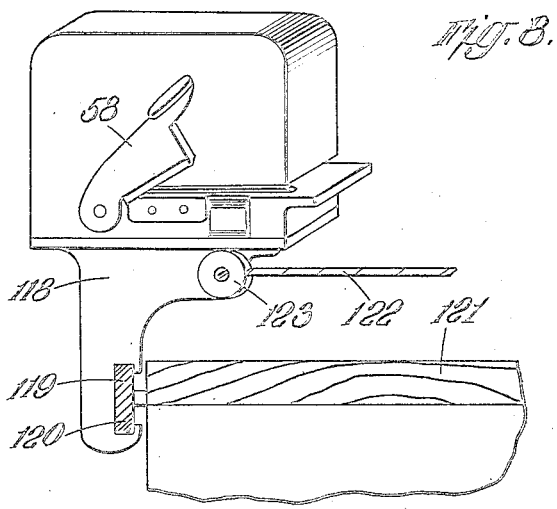

Fig. 8 is a perspective view of the machine and its supporting arrangements, showing also a modification.

Fig. 9 is a fragmentary perspective view of the zeroizing means looking in a direction opposite to that shown in Fig. 7.

Referring to the drawings—

The machine comprises a single main frame member 10, which may conveniently be an aluminium casting, of box-like form and consisting of base 11, side walls 12, 13, and a rear end wall 14 presented to the salesman, the front end, namely that presented to the customer, being open and the lower part of the side-walls 12, 13 being cut away for a considerable distance as at 15. Within the main frame is mounted a sub-frame 16 having a plate 17 facing the customer bridging the free ends of the side walls of the main frame. In the main frame and sub-frame are journalled the shafts of the measuring and indicating mechanism, consisting primarily of a measuring roller 18 mounted on a shaft 18a and a parallel counter shaft 19 driven by the measuring roller through reduction gears 20 and 21 mounted on the shafts 18a and 19 respectively, the gearing being such that the counter shaft makes one complete revolution for every unit of measurement (yard, metre or the like). This counter shaft drives an edge-reading drum 22 on which fractions of a unit are marked for the salesman's use and drives through gears 23 and 24 of one to one ratio a face-reading dial 25 for the customer's use also marked with fractions of a unit.

There are also two subsidiary shafts 26, 27 parallel to the counter shaft 19 and carrying at the front end of the machine face-reading dials 28, 29 for indicating units and tens. The shaft 26 which carries the units dial 28 is connected by means of skew gearing 30, 31 of one to one ratio with a cross shaft 32 carrying an edge-reading drum 33 indicating the units to the salesman.

A similar drum 34 for indicating the tens is mounted on a sleeve loose on the cross shaft 32 and is connected with the shaft 27 of the customer's tens indicator 29 by a skew gearing 35, 36 of one to one ratio. The units counter shaft 26 is provided at the rear end with a toothed wheel 37 having ten teeth which is engaged by a single tooth 38 carried on a collar 39 mounted on the main counter shaft 19. This collar also carries the fractions indicating drum 22 and is not fixed directly to the counter shaft but is carried on a sliding sleeve which is rotated with the counter shaft by means of a dog clutch 40, 41. This sliding sleeve enables the tooth 38 on the collar 39 to be brought out of engagement with the toothed wheel 37 on the units shaft for zero setting purposes. The sliding collar 39 is lightly loaded by a spring 42 to maintain normal engagement with the toothed wheel 37 of the units shaft. The cross shaft 32 carrying the salesman's units drum 33 is geared by a pair of spur gears 43, 44 of one to one ratio with another cross shaft 45 carrying a ratchet wheel 46 and a collar 47 having a single tooth 48 which engages with a ten toothed wheel 49 on the saleman's tens drum 34. Thus at the end of every revolution of the fractions drum 22 the tooth 38 on the sliding collar 39 advances the toothed wheel 37 of the units shaft 26 by one tooth, that is by a tenth of a revolution and in a similar manner at the end of every complete revolution of the units indicators 28, 33 the tens indicators 34, 29 are moved on one tenth of a revolution, the advancing of the units and tens indicators being intermittent. The toothed wheel 49 of the tens indicator and the ratchet wheel 46 on the second cross shaft 45 which rotates with the units indicator are normally engaged by pawls 50, 51 respectively which are loaded by springs 72, 73 so as to slip over the teeth. These pawl and ratchet mechanisms assure that the tens and units indicators are advanced by exactly one division at a time. The pawls of these ratchet mechanisms are disengageable by the zero setting mechanism in the manner to be shown hereafter.

The zero setting mechanism consists of the following elements. Fixed in an eccentric position to the gear 21 carried by the main counter shaft 19 is a heart-shaped cam 52 which is engaged by a roller 53 carried on the end of a lever 54 pivoted at 55 in the end plate 14 of the main frame 10 and loaded with a strong spring 56 so as to maintain a strong engaging pressure between the roller and the cam. This device serves to return the fractions indicators 22, 25 to zero as soon as the measuring roller 18 is released.

In the lower part of the side plates 12, 13 of the frame 10 is journalled a cross shaft 57 carrying a hand lever 58 loaded by a spring 59 so as to normally keep the lever up.

The cross shaft 57 actuates by cranks 60, 61 and a rod 62 an upper cross shaft 63 journalled near the top of the frame 10 and carrying a cam 64 which engages with a pin 65 carried by the gear wheel 21, the pin being so located that if the fractions indicators have made half a revolutions and the roller 53 is dead-centered on the point of the heart-shaped cam 52, depression of the hand lever 58 will communicate an impulse to the pin 65 so as to push the fractions indicating mechanism off the dead-centre. The upper cross shaft 63 also carries a fork 66 which acts to slide the toothed collar 39, 38 on the main counter shaft out of engagement with the toothed wheel 37 on the units counter shaft 26 when the hand lever is depressed so that it is possible for the fractions indicators and the units indicators to return to zero in opposite directions. The crank 61 of the upper cross shaft 63 also engages a rocking lever 67 which in turn engages a pin 68 eccentrically mounted in a disc 69 on the end of the second cross shaft 45 which carries the ratchet wheel 46 of the units indicators and the driving collar 48 for the tens indicators. On depressing the hand lever 58 the rocking lever 67 bears against the pin 68 and brings the units indicators to zero in whichever direction is the shortest. To assure accurate return the collar 47 has formed therein a shallow notch 70 which is engaged by a pawl 71 when the units indicators are at the correct zero, the pawl 71 being formed of springy wire.

Further, the eccentric pin 68 is provided with a light spring bias 74 to throw it off the dead-centre should the machine be stopped with the units indicators at exactly half revolution.

The return of the tens indicators to zero is effected by means of a helical spring 75 which is wound up by the rotation of the tens indicators in the forward direction, so that the return of the tens indicators to zero is always by retracing their travel. To this end one end of the spring is secured to the shaft 27 and the other end to the frame 16. Accurate return of the tens indicators is ensured by the engagement of a pin 115 carried by the shaft 27 with a fixed stop 116. Further, a rod 76 and levers 77, 78 connect the upper cross shaft 63 with the pawl 51. An aperture is provided at the swinging end of lever 78 and the end of rod 76 is placed therein. The aperture acts as a guide for the rod which is adapted to slide therein. The end of the rod 76 is provided with a button to engage the lever 78, so that when the cross shaft 63 and lever 77 are rocked counter-clockwise (as seen in Fig. 7) on depressing the hand lever 58, the lever 78 and pawl 51 are rocked in the same direction, thus causing the pawl 51 to release the ratchet wheel 46. The end of rod 76 also passes through a spring 73, one end of the spring abutting on a stop on the rod and the other end abutting on and exerting pressure upon the apertured end of lever 78 thus maintaining the pawl 51 in contact with the ratchet wheel 46. This arrangement allows the pawl to jump the teeth of the ratchet wheel as the latter advances. The pawl 51 is connected with the stop pawl 50 for the tens indicators by a rocking shaft 79, fork 80, hook 81 and rod 82, the engagement of the fork 80 and hook 81 being arranged with some lost motion so that on depressing the hand lever to set the apparatus to zero the stop pawl 51 of the units indicators is first disengaged, thus permitting the units indicators to return to zero and after this the stop pawl 50 of the tens indicators is disengaged allowing the tens indicators to return to zero. This is necessary in order to prevent jamming between the single tooth 48 and the toothed wheel 49 of the tens indicators during the return to zero.

The machine also includes a pressure roller 83 mounted in a rocking frame 84 which is pivoted in a bracket 85 fixed to the base 11 of the machine, the pivot shaft 86 being parallel to the roller axis and extending through the rear wall 14 of the frame 10. The shaft 86 carries a cam 87 which is arranged to lift by means of a roller 88 a sliding plate 89 on the rear wall 14 of the frame. The sliding plate 89 carries a pin 90 which engages an arm 91 fixed on a rocking shaft 92 of an anti-spinning device which consists of a pawl 93 engaging with a ratchet wheel 94 on the measuring roller 18 and a drop arm 95 arranged to rest on the fabric being measured, the pawl 93 and arm 95 being mounted on shaft 92.

The rocking frame 84 carrying the pressure roller 83 is spring loaded to hold the pressure roller against the measuring roller and is provided with a projection 97 which is engaged by a cam 98 on the cross shaft 57 carrying the operating hand lever, so that on depressing the hand lever the pressure roller 83 is brought clear of the measuring roller 18 while the cam 87 on the rocking-frame pivot-shaft 86 lifts the sliding plate 89 which in turn by means of the pin 90 and arm 91 rocks the shaft 92 of the anti-spinning device to disengage the pawl 93 from the ratchet wheel 94 of the measuring roller 18 and lift the drop arm 95 clear of the fabric. The anti-spinning device and the pressure roller being thus disengaged from the measuring roller, the latter is freed and is automatically returned to zero by the action of the roller 53 pressing on the heart-shaped cam 52.

The return of the anti-spinning device to its normal position is effected by a spring 117 attached to the end of arm 91.

In order to adjust the pressure between the pressure roller and the measuring roller to suit different kinds of fabric the spring loading of the pressure roller is carried out by means of a single tension spring 96, one end of which is attached to the rocking frame 84 carrying the pressure roller and the other end of which is anchored to the bracket 85 by means of a screwed shank 99 and an adjustable nut 100, the pressure between the rollers being adjusted by screwing up or slacking off the nut.

The machine is also provided with a small subsidiary frame 101 fitting in the cut out space 15 at the lower part of the main frame. This subsidiary frame comprises a flat portion 102 over which the fabric to be measured is drawn and on which is marked a starting line 103. In the subsidiary frame is pivoted at 107 a trigger bar 104 loaded by a spring 106 and which engages with a projection 105 on the rocking frame 84 of the pressure roller to hold the latter out of engagement. The trigger bar 105 is releasable by means of a plunger 108 operated by a simple finger lever 109.

An external casing 113 encloses the upper part of the machine and is arranged to be easily removable. This casing is provided with windows 114 through which the indicators can be viewed, said windows being provided with fiduciary marks as required.

The subsidiary frame also carries a fixed blade 110 of the shears for slitting the fabric, the movable blade 111 being mounted on the operating handle 58 and a helical spring 112 for pressing the blades against one another being mounted on the operating lever cross shaft 57.

Fig. 8 shows the mounting of the machine to a salesman's counter 121 which carries a rail 120 which engages a guideway 119 formed in a pedestal 118 on which the body 10 of the machine is mounted.

In a modified form of the machine, shown in Fig. 8, the pedestal 118 has mounted thereon a housing 123 which carries a spring loaded reel (not shown) carrying a measuring tape 122, which may conveniently be of strip steel, for measuring the width of the fabric. To prevent the tape 122 from being used for measuring lengths, it may conveniently be marked with standard widths only.

The present invention is not restricted to machines for measuring cloth and other textile fabrics but may be applied to machines for measuring paper, tapes, ribbons, rubber or the like sheet material, carpets and the like heavy textiles, string, rope and all materials made in continuous lengths.

What I claim is:—

1. In a machine for measuring textile fabrics and the like, a rotatable indicating device and a part rotatable therewith, a movable pressure roller and a fixedly mounted measuring roller, means comprising a pin eccentrically mounted on said part rotatable with the indicating device, a rocking shaft and a cam thereon adapted to engage with said pin and impart rotary movement to it and the indicating device for throwing the latter off dead-centre for resetting to its zero position, said rocking shaft being actuated by the withdrawal of the movable pressure roller.

2. A measuring or counting machine for textile fabrics and the like comprising a fractional indicator, a units indicator, a tens indicator, drive means whereby the fractional indicator upon completing a cycle advances the units indicator through part of a cycle and the units indicator upon completing a cycle advances the tens indicator through part of a cycle, means for independently resetting each of said indicators to zero position, and means for releasing said indicators whereby the fractional and units indicators are first returned to zero practically simultaneously and thereupon the tens indicator is returned to zero after the units indicator has substantially completed its zero return movement.

3. A measuring or counting machine for textile fabrics and the like comprising at least two cyclically operating indicating devices, drive means whereby the first such device on completing a cycle advances the second such device through part of a cycle, means for re-setting the first indicating device to zero position, means for re-setting the second indicating device to zero position and means for releasing both indicating devices for return to zero position so constructed, arranged and operating that the return of the first indicating device to zero position is substantially completed before the second indicating device is released for return to zero position.

4. In a machine for measuring textile fabrics and the like including a measuring roller mounted in fixed bearings, a rotary indicator driven thereby, a movable pressure roller spring loaded to press the fabric to be measured against the measuring roller and hand lever means for withdrawing the pressure roller from the measuring roller, an eccentric boss rotatable with the indicator, a movable member and spring means operative on said movable member to press the same into engagement with said eccentric boss and thereby exert a permanent bias on said indicator towards the zero position in the direction of least displacement, i. e. half a revolution or less, whereby on releasing the indicator from restraint, as by the withdrawal of the pressure roller leaving the measuring roller free to rotate, the indicator is immediately re-set to zero.

5. A machine for measuring textile fabrics and the like including a measuring roller mounted in fixed bearings, a rotary indicator driven thereby, a movable pressure roller spring loaded to press the fabric to be measured against the measuring roller and hand lever means for withdrawing the pressure roller from the measuring roller, spring means permanently biasing the indicator to zero position in the direction of least displacement, i. e. half a revolution or less, and means for utilizing the presence of fabric between the rollers not only to rotate the indicator in measuring but also to restrain it against the zeroizing bias, until the pressure roller is withdrawn from the measuring roller, said last named means including a spring pressed arm engaging the fabric, pawl and ratchet means connected to the measuring roller and the spring pressed arm, and a permanently engaged transmission for continuous drive between the measuring roller and the indicator.

6. A machine for measuring textile fabrics and the like including a measuring roller mounted in fixed bearings, a rotary indicator driven thereby, a movable pressure roller spring loaded to press the fabric to be measured against the measuring roller and hand lever means for withdrawing the pressure roller from the measuring roller, spring means permanently biasing the indicator to zero position in the direction of least displacement i. e. half a revolution or less, means for preventing the zeroizing bias from operating to reset the indicator to zero, said last named means including a permanently engaged transmission for continuous drive between the measuring roller and the indicator and spring actuated means adapted to restrain the measuring roller against rotation in one direction, together with means actuated by the said hand lever means for disengaging said spring actuated restraining means and permitting the zeroizing bias means to reset the indicator to zero simultaneously with the withdrawal of the pressure roller.

7. In a machine for measuring textile fabrics and the like including a measuring roller mounted in fixed bearings, a rotary indicator driven thereby, a movable pressure roller spring loaded to bear on the measuring roller and hand lever means for withdrawing the pressure roller from the measuring roller; means for re-setting the indicator to zero simultaneously with the withdrawal of the pressure roller, said means including an eccentric member rotatable with said indicator, spring means operative on said eccentric member to bias the indicator towards zero position in the direction of least displacement, i. e. by half a revolution or less and means for displacing the indicator from dead-centre, said last-named means comprising a second eccentric member rotatable with the indicator and means actuated by said hand lever means for giving said second eccentric member an impulse and thereby displacing the indicator from dead-centre position.

ROGER HERBERT WALTER.